(12) United States Patent
Hol et al.

(10) Patent No.: US 12,411,560 B2
(45) Date of Patent: Sep. 9, 2025

(54) DYNAMIC INITIALIZATION OF 3DOF AR TRACKING SYSTEM

(71) Applicant: Snap Inc., Santa Monica, CA (US)

(72) Inventors: Jeroen Diederik Hol, Hengelo (NL); Matthias Kalkgruber, Vienna (AT)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/435,540

(22) Filed: Feb. 7, 2024

(65) Prior Publication Data

US 2024/0176428 A1     May 30, 2024

Related U.S. Application Data

(63) Continuation of application No. 17/524,423, filed on Nov. 11, 2021, now Pat. No. 11,941,184.

(60) Provisional application No. 63/189,845, filed on May 18, 2021.

(51) Int. Cl.
G06F 3/0346     (2013.01)
G06F 3/038     (2013.01)

(52) U.S. Cl.
CPC ............ G06F 3/0346 (2013.01); G06F 3/038 (2013.01)

(58) Field of Classification Search
CPC .............................. G06F 3/0346; G06F 3/038
See application file for complete search history.

(56) References Cited

U.S. PATENT DOCUMENTS

| | | | |
|---|---|---|---|
| 10,514,776 B2 | 12/2019 | Liberty et al. |
| 10,545,584 B2 | 1/2020 | Tome et al. |
| 10,686,980 B1 | 6/2020 | Ricci et al. |
| 10,884,505 B1 | 1/2021 | Huo et al. |
| 11,435,820 B1 | 9/2022 | Hirsh et al. |
| 11,676,348 B2 | 6/2023 | Simpson et al. |
| 2005/0174324 A1 | 8/2005 | Liberty et al. |
| 2008/0080789 A1 | 4/2008 | Marks et al. |
| 2012/0212374 A1 | 8/2012 | Kirby et al. |

(Continued)

FOREIGN PATENT DOCUMENTS

| | | |
|---|---|---|
| CN | 117337422 A | 1/2024 |
| EP | 2008697 A1 | 12/2008 |
| WO | WO-2022245815 A1 | 11/2022 |

OTHER PUBLICATIONS

"U.S. Appl. No. 17/524,423, Final Office Action mailed Feb. 14, 2023", 12 pgs.

(Continued)

*Primary Examiner* — Ariel A Balaoing

(74) *Attorney, Agent, or Firm* — Schwegman Lundberg & Woessner, P.A.

(57) ABSTRACT

A method for dynamically initializing a 3 degrees of freedom (3DOF) tracking device is described. In one aspect, the method includes accessing a gyroscope signal from a gyroscope of the 3DOF tracking device, accessing an accelerometer signal from an accelerometer of the 3DOF tracking device, determining an initial state includes a combination of an initial orientation, an initial position, and an initial velocity of the 3DOF tracking device, the initial state indicating a starting condition of the 3DOF tracking device, integrating the gyroscope signal and the accelerometer signal to obtain orientation and position signals using the initial state, and refining an inclination signal of the orientation signal using the position signal.

20 Claims, 10 Drawing Sheets

(56) References Cited

U.S. PATENT DOCUMENTS

| | | | |
|---|---|---|---|
| 2013/0179108 A1 | 7/2013 | Joseph et al. | |
| 2014/0062881 A1 | 3/2014 | Solomon et al. | |
| 2015/0261291 A1* | 9/2015 | Mikhailov | G06T 7/73 |
| | | | 345/156 |
| 2015/0294505 A1* | 10/2015 | Atsmon | G06F 3/04815 |
| | | | 345/633 |
| 2016/0139665 A1 | 5/2016 | Lopez et al. | |
| 2018/0031829 A1* | 2/2018 | Thomas | G02B 27/0093 |
| 2018/0088685 A1 | 3/2018 | Sang et al. | |
| 2018/0164878 A1 | 6/2018 | Mcgee et al. | |
| 2020/0319471 A1* | 10/2020 | Goslin | G02B 27/0179 |
| 2022/0075447 A1 | 3/2022 | Guo et al. | |
| 2022/0374091 A1 | 11/2022 | Hol et al. | |

OTHER PUBLICATIONS

"U.S. Appl. No. 17/524,423, Non Final Office Action mailed Jul. 21, 2023", 15 pgs.

"U.S. Appl. No. 17/524,423, Non Final Office Action mailed Oct. 5, 2022", 12 pgs.

"U.S. Appl. No. 17/524,423, Notice of Allowance mailed Nov. 24, 2023", 7 pgs.

"U.S. Appl. No. 17/524,423, Response filed May 15, 2023 to Final Office Action mailed Feb. 14, 2023", 10 pgs.

"U.S. Appl. No. 17/524,423, Response filed Oct. 23, 2023 to Non Final Office Action mailed Jul. 21, 2023", 13 pgs.

"International Application Serial No. PCT/US2022/029621, International Preliminary Report on Patentability mailed Nov. 30, 2023", 11 pgs.

"International Application Serial No. PCT/US2022/029621, International Search Report mailed Sep. 6, 2022", 5 pgs.

"International Application Serial No. PCT/US2022/029621, Written Opinion mailed Sep. 6, 2022", 9 pgs.

Manon, Kok, et al., "Using Inertial Sensors for Position and Orientation Estimation", arxiv.org, Cornell University Library, 201 Olin Library Cornell University Ithaca, NY 14853, (Apr. 20, 2017).

Wetzstein, Gordon, "EE 267 Virtual Reality Course Notes: 3-DOF Orientation Tracking with IMUs", <https://web.archive.org/web/20200427033716/https://stanford.edu/class/ee267/notes/ee267_notes_imu.pdf>, (Apr. 27, 2020), 1-14.

* cited by examiner

DYNAMIC INITIALIZATION OF 3DOF AR TRACKING SYSTEM

RELATED APPLICATION

The present application is a continuation of U.S. patent application Ser. No. 17/524,423, filed Nov. 11, 2021, which claims priority to U.S. Provisional Patent Application Ser. No. 63/189,845, filed May 18, 2021, which are hereby incorporated by reference in their entirety.

TECHNICAL FIELD

The subject matter disclosed herein generally relates to a visual tracking system. Specifically, the present disclosure addresses systems and methods for calibrating visual-inertial tracking systems.

BACKGROUND

An augmented reality (AR) device enables a user to observe a scene while simultaneously seeing relevant virtual content that may be aligned to items, images, objects, or environments in the field of view of the device. A virtual reality (VR) device provides a more immersive experience than an AR device. The VR device blocks out the field of view of the user with virtual content that is displayed based on a position and orientation of the VR device.

Both AR and VR devices rely on motion tracking system that track a pose (e.g., orientation, position, location) of the device. The motion tracking system is typically factory calibrated (based on predefined relative positions between the cameras and other sensors) to accurately display the virtual content at a desired location relative to its environment.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
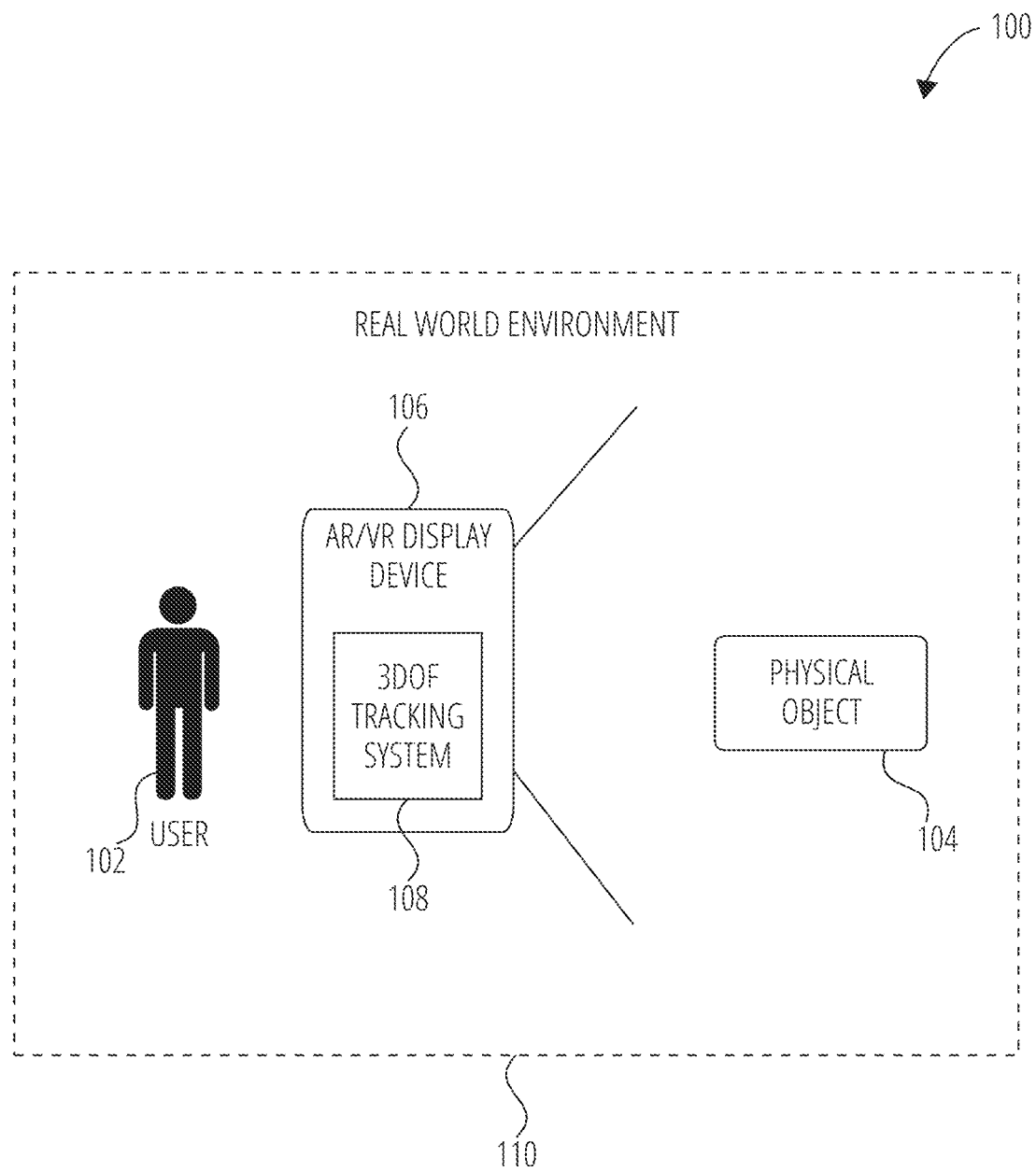
FIG. 1 is a block diagram illustrating an environment for operating an AR/VR display device in accordance with one example embodiment.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

The term "augmented reality" (AR) is used herein to refer to an interactive experience of a real-world environment where physical objects that reside in the real-world are "augmented" or enhanced by computer-generated digital content (also referred to as virtual content or synthetic content). AR can also refer to a system that enables a combination of real and virtual worlds, real-time interaction, and 3D registration of virtual and real objects. A user of an AR system perceives virtual content that appears to be attached or interact with a real-world physical object.

The term "virtual reality" (VR) is used herein to refer to a simulation experience of a virtual world environment that is completely distinct from the real-world environment. Computer-generated digital content is displayed in the virtual world environment. VR also refers to a system that enables a user of a VR system to be completely immersed in the virtual world environment and to interact with virtual objects presented in the virtual world environment.

The term "AR application" is used herein to refer to a computer-operated application that enables an AR experience. The term "VR application" is used herein to refer to a computer-operated application that enables a VR experience. The term "AR/VR application" refers to a computer-operated application that enables a combination of an AR experience or a VR experience.

The term "visual tracking system" is used herein to refer to a computer-operated application or system that enables a system to track visual features identified in images captured by one or more cameras of the visual tracking system. The visual tracking system builds a model of a real-world environment based on the tracked visual features. Non-limiting examples of the visual tracking system include: a visual Simultaneous Localization and Mapping system (VSLAM), and Visual Inertial Odometry (VIO) system. VSLAM can be used to build a target from an environment, or a scene based on one or more cameras of the visual tracking system. A VIO system (also referred to as a visual-inertial tracking system) determines a latest pose (e.g., position and orientation) of a device based on data acquired from multiple sensors (e.g., optical sensors, inertial sensors) of the device.

The term "Inertial Measurement Unit" (IMU) is used herein to refer to a device that can report on the inertial status of a moving body including the acceleration, velocity, orientation, and position of the moving body. An IMU enables tracking of movement of a body by integrating the acceleration and the angular velocity measured by the IMU. IMU can also refer to a combination of accelerometers and gyroscopes that can determine and quantify linear acceleration and angular velocity, respectively. The values obtained from the IMUs gyroscopes can be processed to obtain the pitch, roll, and heading of the IMU and, therefore, of the body with which the IMU is associated. Signals from the IMU's accelerometers also can be processed to obtain velocity and displacement of the IMU.

The term "three-degrees of freedom tracking system" (3DOF tracking system) is used herein to refer to a device that tracks rotational movement. For example, the 3DOF tracking system can track whether a user of a head-wearable device is looking left or right, rotating their head up or down, and pivoting left or right. However, the head-wearable device cannot use the 3DOF tracking system to determine whether the user has moved around a scene by moving in the physical world. As such, 3DOF tracking system may not be accurate enough to be used for positional signals. The 3DOF tracking system may be part of an AR/VR display device that includes IMU sensors. For example, the 3DOF tracking system uses sensor data from sensors such as accelerometers, gyroscopes, and magnetometers.

The term "six-degrees of freedom tracking system" (6DOF tracking system) is used herein to refer to a device that tracks rotational and translational motion. For example, the 6DOF tracking system can track whether the user has rotated their head and moved forward or backward, laterally or vertically and up or down. The 6DOF tracking system may include a visual odometry system that relies on data acquired from multiple sensors (e.g., depth cameras, inertial sensors). The 6DOF tracking system analyzes data from the sensors to accurately determine the pose of the display device.

Both AR and VR applications allow a user to access information, such as in the form of virtual content rendered in a display of an AR/VR display device (also referred to as a display device). The rendering of the virtual content may be based on a position of the display device relative to a physical object or relative to a frame of reference (external to the display device) so that the virtual content correctly appears in the display. For AR, the virtual content appears aligned with a physical object as perceived by the user and a camera of the AR display device. The virtual content appears to be attached to the physical world (e.g., a physical object of interest). To do this, the AR display device detects the physical object and tracks a pose of the AR display device relative to the position of the physical object. A pose identifies a position and orientation of the display device relative to a frame of reference or relative to another object. For VR, the virtual object appears at a location based on the pose of the VR display device. The virtual content is therefore refreshed based on the latest pose of the device. A visual tracking system at the display device determines the pose of the display device. An example of a visual tracking system includes a visual-inertial tracking system (also referred to as VIO system) that relies on data acquired from multiple sensors (e.g., optical sensors, inertial sensors).

Initialization of a 3DOF tracking system typically requires the tracking system to be stationary in order to calibrate the sensors in the 3DOF tracking system. For example, the 3DOF tracking system detects that an AR/VR display device is turned/switched on. In response, the AR/VR display device requests the user to set the AR/VR display device on a stationary support (e.g., a table, a chair). Such initialization process creates friction for the user to operate the AR/VR display device efficiently. Furthermore, such initialization process requires additional time to initialize under the stationary conditions.

The present application describes a method for dynamic initialization of a 3DOF tracking system of an AR/VR display device that allows the AR/VR display device to instantly initialize and starts a 3DoF (gravity aligned) tracking experience under dynamic and non-stationary conditions. In one example, the present method relies on the assumption that people stay roughly on the same spot is valid for most use cases (sitting, walking). As such, this removes the requirement that the user needs to remain still.

In one example embodiment, the method includes collecting accelerometer and gyroscope signals, integrating to orientation and position signals, constraining the position signal to remain 'close' to the (zero) starting position (which enable displaying of gravity aligned content in a head-worn AR system and do not require the user to be stationary while initializing).

In another example embodiment, a method for dynamically initializing a 3 degrees of freedom (3DOF) tracking device is described. In one aspect, the method includes accessing a gyroscope signal from a gyroscope of the 3DOF tracking device, accessing an accelerometer signal from an accelerometer of the 3DOF tracking device, determining an initial state includes a combination of an initial orientation, an initial position, and an initial velocity of the 3DOF tracking device, the initial state indicating a starting condition of the 3DOF tracking device, integrating the gyroscope signal and the accelerometer signal to obtain orientation and position signals using the initial state, and refining an inclination signal of the orientation signal using the position signal.

As a result, one or more of the methodologies described herein facilitate solving the technical problem of efficient initialization without requiring stationary conditions. The presently described method provides an improvement to an operation of the functioning of a computer by faster calibration computation. As such, one or more of the methodologies described herein may obviate a need for certain efforts or computing resources. Examples of such computing resources include Processor cycles, network traffic, memory usage, data storage capacity, power consumption, network bandwidth, and cooling capacity.

FIG. 1 is a network diagram illustrating an environment 100 suitable for operating an AR/VR display device 106, according to some example embodiments. The environment 100 includes a user 102, an AR/VR display device 106, and a physical object 104. A user 102 operates the AR/VR display device 106. The user 102 may be a human user (e.g., a human being), a machine user (e.g., a computer configured by a software program to interact with the AR/VR display device 106), or any suitable combination thereof (e.g., a human assisted by a machine or a machine supervised by a human). The user 102 is associated with the AR/VR display device 106.

The AR/VR display device 106 may be a computing device with a display such as a smartphone, a tablet computer, or a wearable computing device (e.g., watch or glasses). The computing device may be hand-held or may be removable mounted to a head of the user 102. In one example, the display includes a screen that displays images captured with a camera of the AR/VR display device 106. In another example, the display of the device may be transparent such as in lenses of wearable computing glasses. In other examples, the display may be non-transparent, partially transparent, partially opaque. In yet other examples, the display may be wearable by the user 102 to cover the field of vision of the user 102.

The AR/VR display device 106 includes an AR application that generates virtual content based on images detected with the camera of the AR/VR display device 106. For example, the user 102 may point a camera of the AR/VR display device 106 to capture an image of the physical object 104. The AR application generates virtual content corresponding to an identified object (e.g., physical object 104) in the image and presents the virtual content in a display of the AR/VR display device 106.

The AR/VR display device 106 includes a 3DOF tracking system 108. The 3DOF tracking system 108 tracks a rotational pose (e.g., orientation) of the AR/VR display device 106 relative to the real world environment 110 using, for example, optical sensors (e.g., depth-enabled 3D camera, image camera), inertial sensors (e.g., gyroscope, accelerometer), wireless sensors (Bluetooth, Wi-Fi), GPS sensor, and audio sensor. In one example, the AR/VR display device 106 displays virtual content based on the pose of the AR/VR display device 106 relative to the real world environment 110 and/or the physical object 104.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 4 to FIG. 5. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The AR/VR display device 106 may operate over a computer network. The computer network may be any network that enables communication between or among machines, databases, and devices. Accordingly, the computer network may be a wired network, a wireless network (e.g., a mobile or cellular network), or any suitable combination thereof. The computer network may include one or more portions that constitute a private network, a public network (e.g., the Internet), or any suitable combination thereof.

Figure 2:
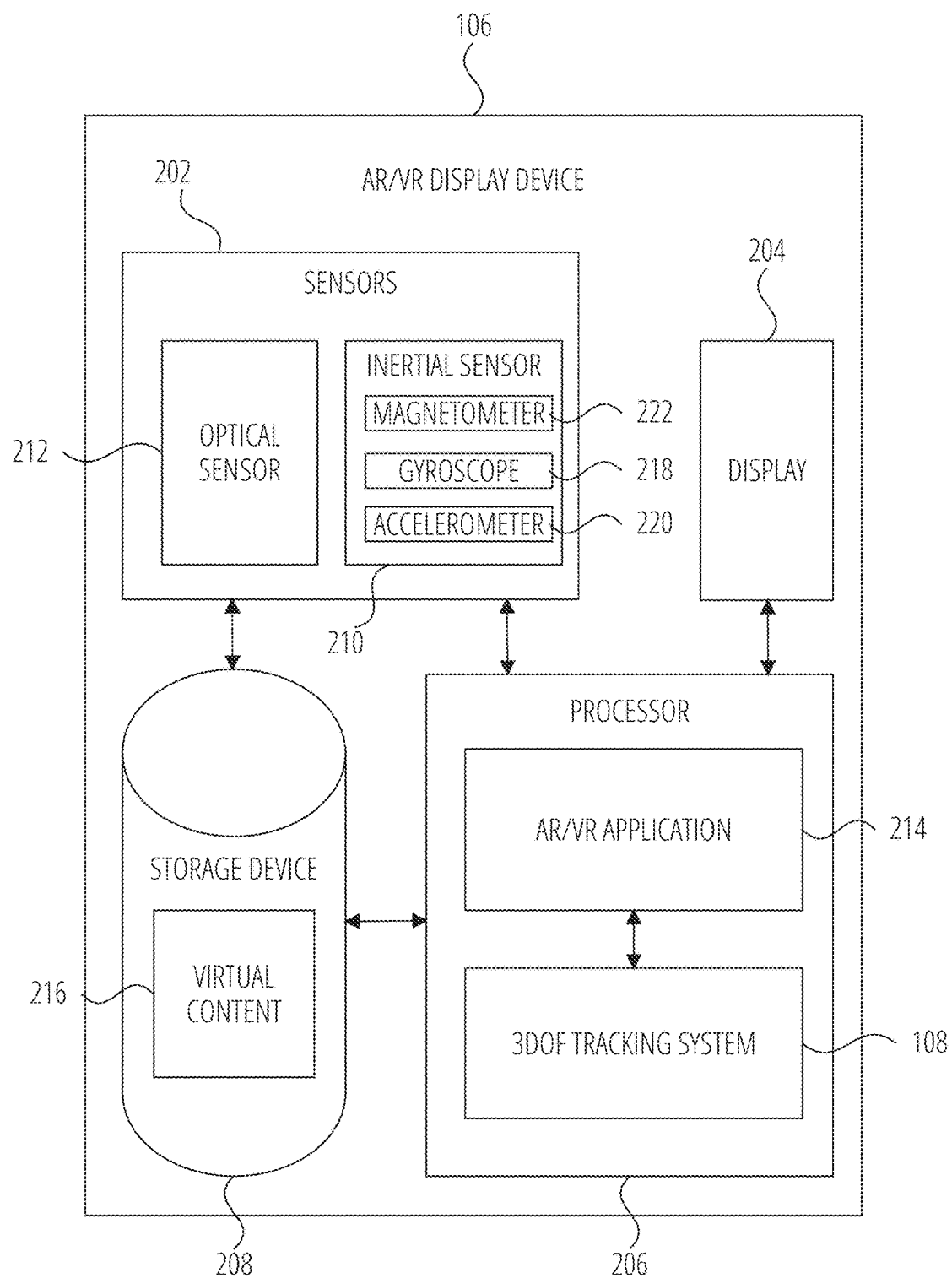
FIG. 2 is a block diagram illustrating an AR/VR display device in accordance with one example embodiment.

FIG. 2 is a block diagram illustrating modules (e.g., components) of the AR/VR display device 106, according to some example embodiments. The AR/VR display device 106 includes sensors 202, a display 204, a processor 206, and a storage device 208. Examples of AR/VR display device 106 include a wearable computing device, a mobile computing device, a navigational device, a portable media device, or a smart phone.

The sensors 202 include, for example, an optical sensor 212 (e.g., camera such as a color camera, a thermal camera, a depth sensor and one or multiple grayscale, global/rolling shutter tracking cameras) and an inertial sensor 210 (e.g., gyroscope 218, accelerometer 220, magnetometer 222). Other examples of sensors 202 include a proximity or location sensor (e.g., near-field communication, GPS, Bluetooth, Wifi, radio-based sensor 312), an audio sensor (e.g., a microphone), a thermal sensor, a pressure sensor (e.g., barometer), or any suitable combination thereof. It is noted that the sensors 202 described herein are for illustration purposes and the sensors 202 are thus not limited to the ones described above.

The display 204 includes a screen or monitor configured to display images generated by the processor 206. In one example embodiment, the display 204 may be transparent or semi-opaque so that the user 102 can see through the display 204 (in AR use case). In another example embodiment, the display 204 covers the eyes of the user 102 and blocks out the entire field of view of the user 102 (in VR use case). In another example, the display 204 includes a touchscreen display configured to receive a user input via a contact on the touchscreen display.

The processor 206 includes an AR/VR application 214 and a 3DOF tracking system 108. The AR/VR application 214 retrieves virtual content (e.g., 3D object model) based on a detection of the physical object 104 or physical environment. The AR/VR application 214 renders the virtual object in the display 204. In one example embodiment, the AR/VR application 214 includes a local rendering engine that generates a visualization of virtual content overlaid (e.g., superimposed upon, or otherwise displayed in tandem with) on an image of the physical object 104 captured by the optical sensor 212. A visualization of the virtual content may be manipulated by adjusting a position of the physical object 104 (e.g., its physical location, orientation, or both) relative to the AR/VR display device 106. Similarly, the visualization of the virtual content may be manipulated by adjusting a pose of the AR/VR display device 106 relative to the physical object 104. For a VR application, the AR/VR application 214 displays the virtual content in the display 204 at a location (in the display 204) determined based on a pose of the AR/VR display device 106.

The 3DOF tracking system 108 estimates a rotational pose of the AR/VR display device 106. For example, the 3DOF tracking system 108 uses sensor signals from the inertial sensor 210 to track a location of the AR/VR display device 106 relative to a frame of reference (e.g., real world environment 110). As such, the 3DOF tracking system 108 tracks whether the user 102 of the AR/VR display device 106 is looking left or right, rotating their head up or down, and pivoting/tilting left or right.

In one example embodiment, the 3DOF tracking system 108 is initialized under dynamic and non-stationary conditions. In other words, the 3DOF tracking system 108 instantly initializes and starts a 3DoF (gravity aligned) tracking experience under dynamic and non-stationary conditions. In one example, the present method relies on the assumption that people stay roughly on the same spot is valid for most use cases (sitting, walking). Example components of the 3DOF tracking system 108 are described in more detail below with respect to FIG. 3.

The storage device 208 stores virtual content 216. The virtual content 216 includes, for example, a database of visual references (e.g., images of physical objects) and corresponding experiences (e.g., three-dimensional virtual object models).

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
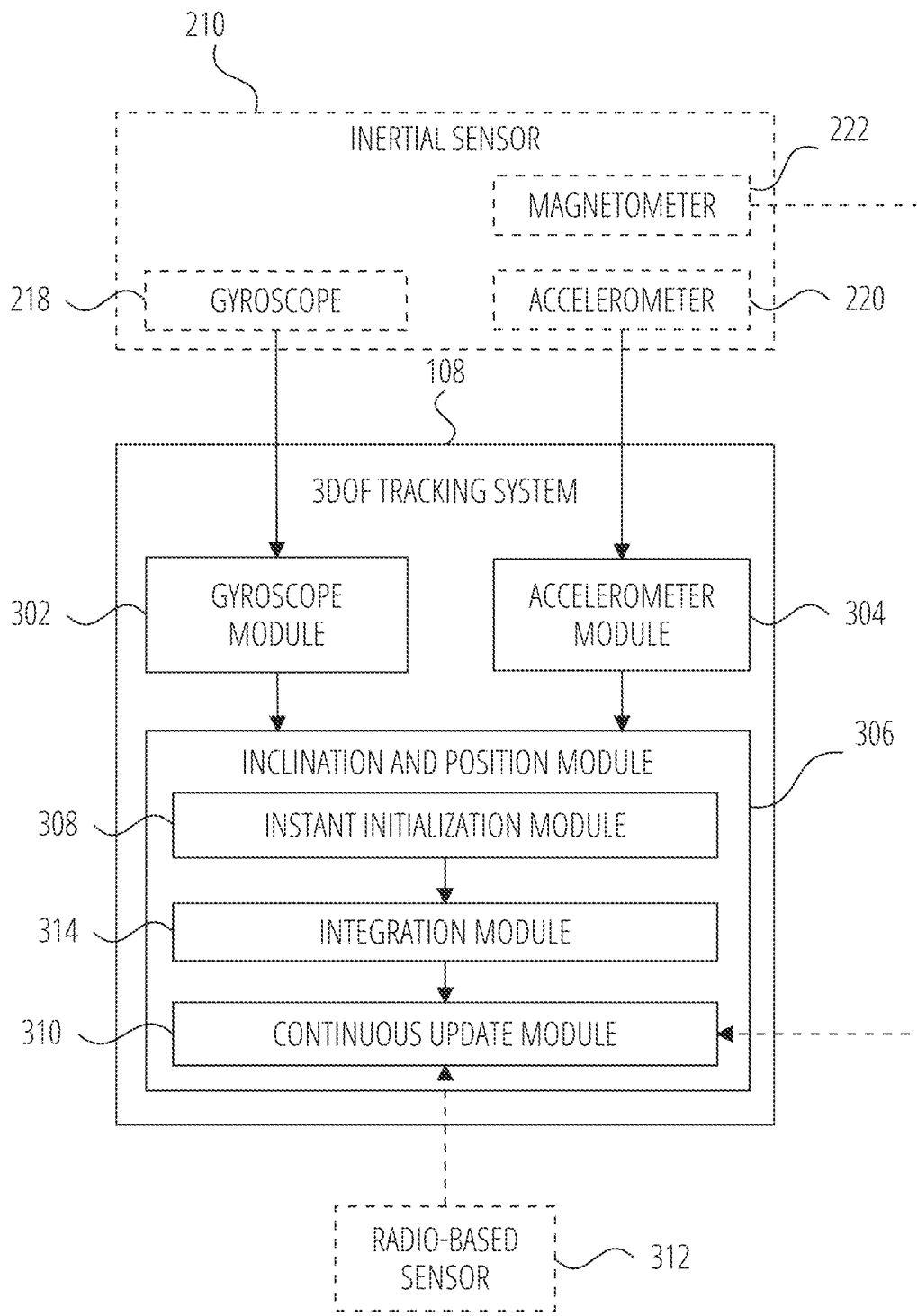
FIG. 3 is a block diagram illustrating a 3DOF tracking system in accordance with one example embodiment.

FIG. 3 is a block diagram illustrating the 3DOF tracking system 108 in accordance with one example embodiment. The 3DOF tracking system 108 includes a gyroscope module 302, an accelerometer module 304, an inclination and position module 306.

The gyroscope module 302 retrieves gyroscope signal from the gyroscope 218. The accelerometer module 304 retrieves accelerometer signal from the accelerometer 220.

The inclination and position module 306 performs the dynamic initialization by accessing the accelerometer and gyroscope signals from the accelerometer module 304 and the gyroscope module 302 respectively. The inclination and position module 306 integrates orientation and position signals, constrains the position signal to remain 'close' to the (zero) starting position.

In one example embodiment, the inclination and position module 306 includes an instant initialization module 308, an integration module 314, and a continuous update module 310. The instant initialization module 308 determines an initial state that indicates a starting position. The initial state comprises a combination of an initial orientation, an initial position, and an initial velocity of the 3DOF tracking system 108.

The integration module 314 integrates the gyroscope signal and the accelerometer signal to obtain orientation and position signals using the initial state. In one example, the integration module 314 integrates the gyroscope signal to determine the orientation signal starting from the initial orientation, rotates an additional accelerometer signal from the accelerometer using the orientation signal, subtract gravity, and performs a double integration starting from the initial position to determine the position signal.

The continuous update module 310 refines an inclination signal of the orientation signal using the position signal. In one example, the continuous update module 310 corrects the gyroscope signal and the accelerometer signal with biases and refines the inclination signal and biases using the position signal. In another example, the continuous update module 310 accesses a magnetometer signal from the magnetometer 222 of the inertial sensor 210. The continuous update module 310 refines the orientation signal using the magnetometer signal. In yet another example, the continuous update module 310 accesses a location signal from a radio-based sensor 312 of the AR/VR display device 106. The continuous update module 310 refines the position signal using the location signal.

Figure 4:
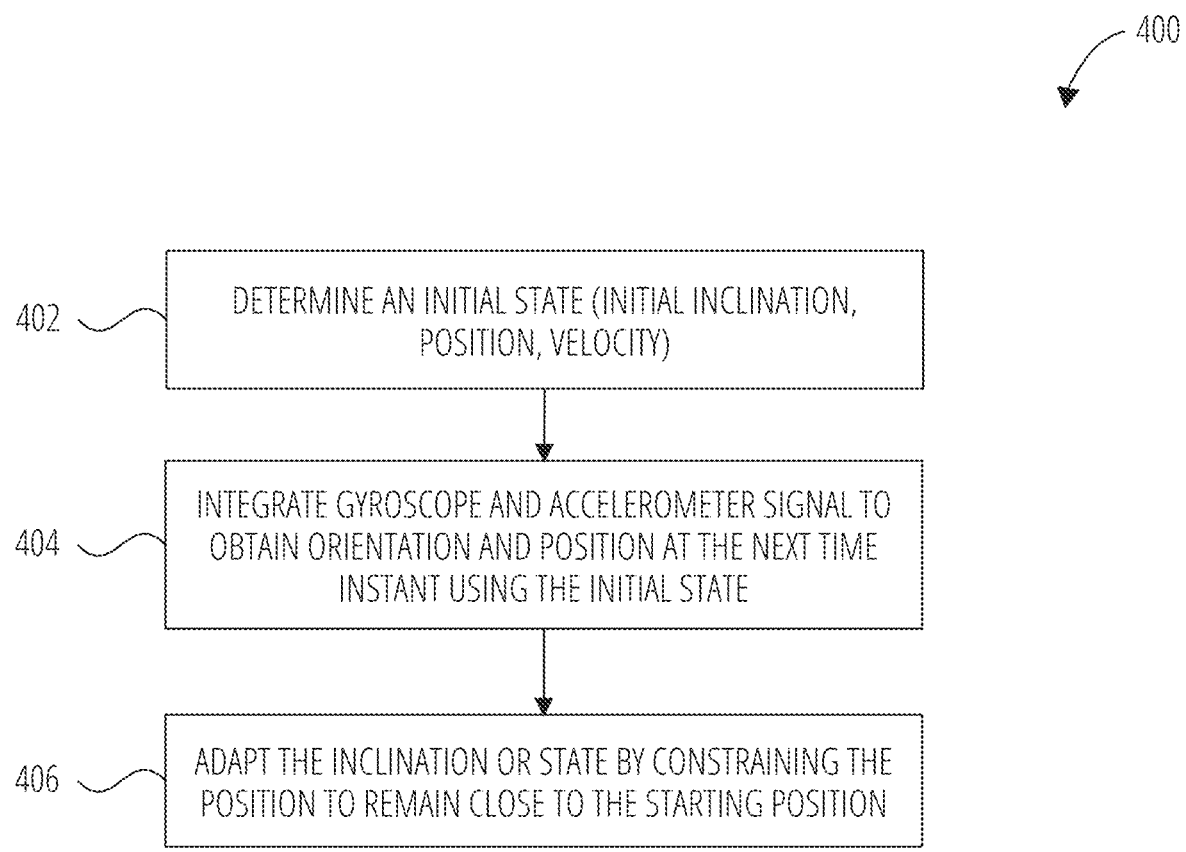
FIG. 4 is a flow diagram illustrating a method for adapting the inclination in accordance with one example embodiment.

FIG. 4 is a flow diagram illustrating a method for adapting the inclination in accordance with one example embodiment. Operations in the method 400 may be performed by the 3DOF tracking system 108, using components (e.g., modules, engines) described above with respect to FIG. 3. Accordingly, the method 400 is described by way of example with reference to the inclination and position module 306. However, it shall be appreciated that at least some of the operations of the method 400 may be deployed on various other hardware configurations or be performed by similar components residing elsewhere.

In block 402, the inclination and position module 306 determines an initial state (initial inclination, position, velocity). In one example, the initial state comprises an initial position and an initial velocity. In block 404, the inclination and position module 306 integrates gyroscope and accelerometer signal to obtain orientation and position at the next time instant using the initial state. In block 406, the inclination and position module 306 adapts the inclination or state by constraining the position to remain close to the starting position.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

Figure 5:
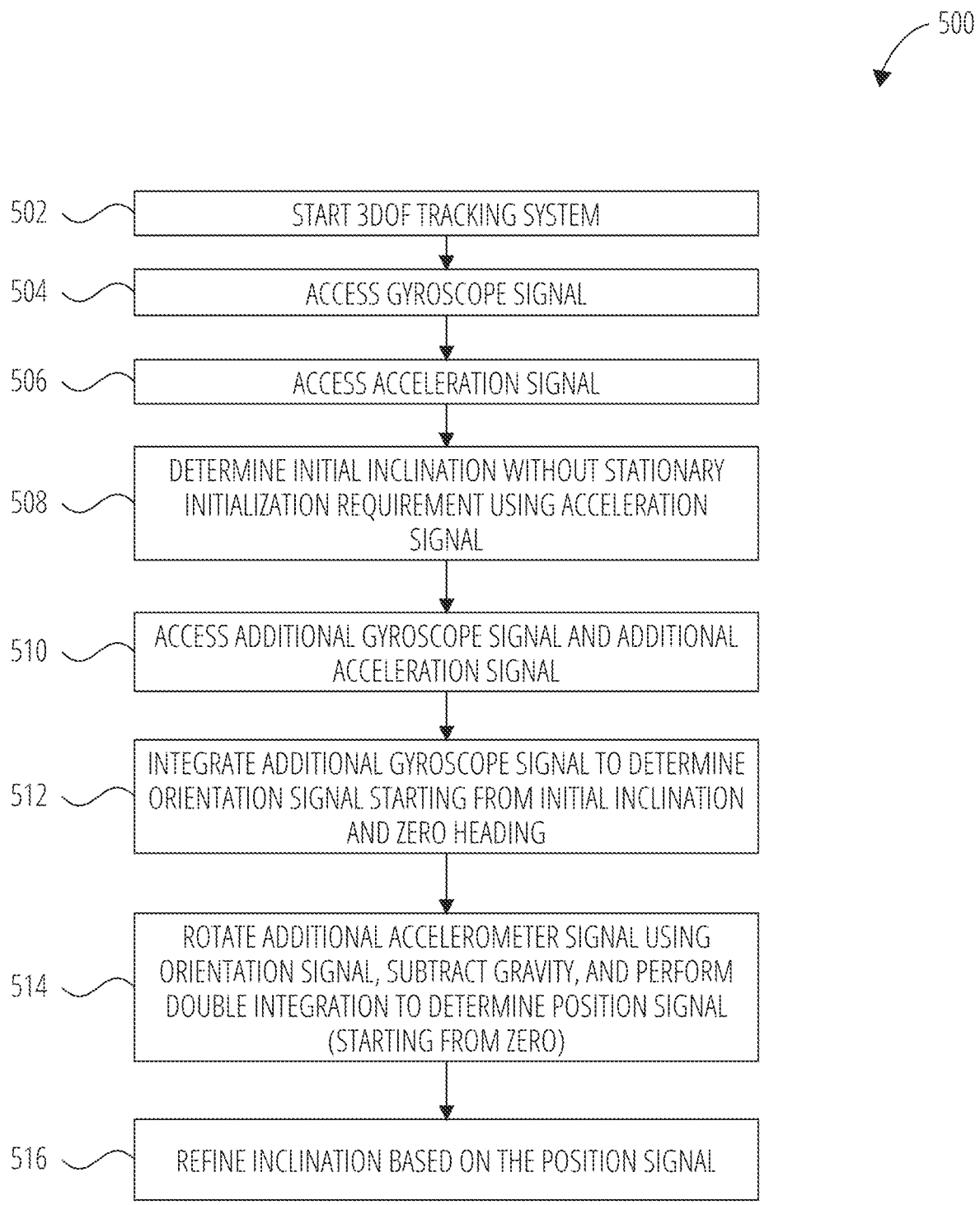
FIG. 5 is a flow diagram illustrating a method for refining an inclination signal in accordance with one example embodiment.

FIG. 5 is a flow diagram illustrating a method for refining an inclination signal in accordance with one example embodiment. Operations in the method 500 may be performed by the 3DOF tracking system 108, using components (e.g., modules, engines) described above with respect to FIG. 3. Accordingly, the method 500 is described by way of example with reference to the inclination and position module 306. However, it shall be appreciated that at least some of the operations of the method 500 may be deployed on various other hardware configurations or be performed by similar components residing elsewhere.

In block 502, the AR/VR display device 106 starts the 3DOF tracking system 108. In block 504, the gyroscope module 302 accesses gyroscope signal from the gyroscope 218. In block 506, the accelerometer module 304 access acceleration signal from the accelerometer 220. In block 508, the instant initialization module 308 determines initial inclination without stationary initialization requirement using acceleration signal. In block 510, the instant initialization module 308 accesses additional gyroscope signal and additional acceleration signal. In block 512, the instant initialization module 308 integrates additional gyroscope signal to determine orientation signal starting from initial inclination and zero heading. In block 514, the instant initialization module 308 rotates additional accelerometer signal using orientation signal, subtracts gravity, and performs double integration to determine position signal (starting from zero). In block 516, the continuous update module 310 refines inclination based on the position signal.

Figure 6:
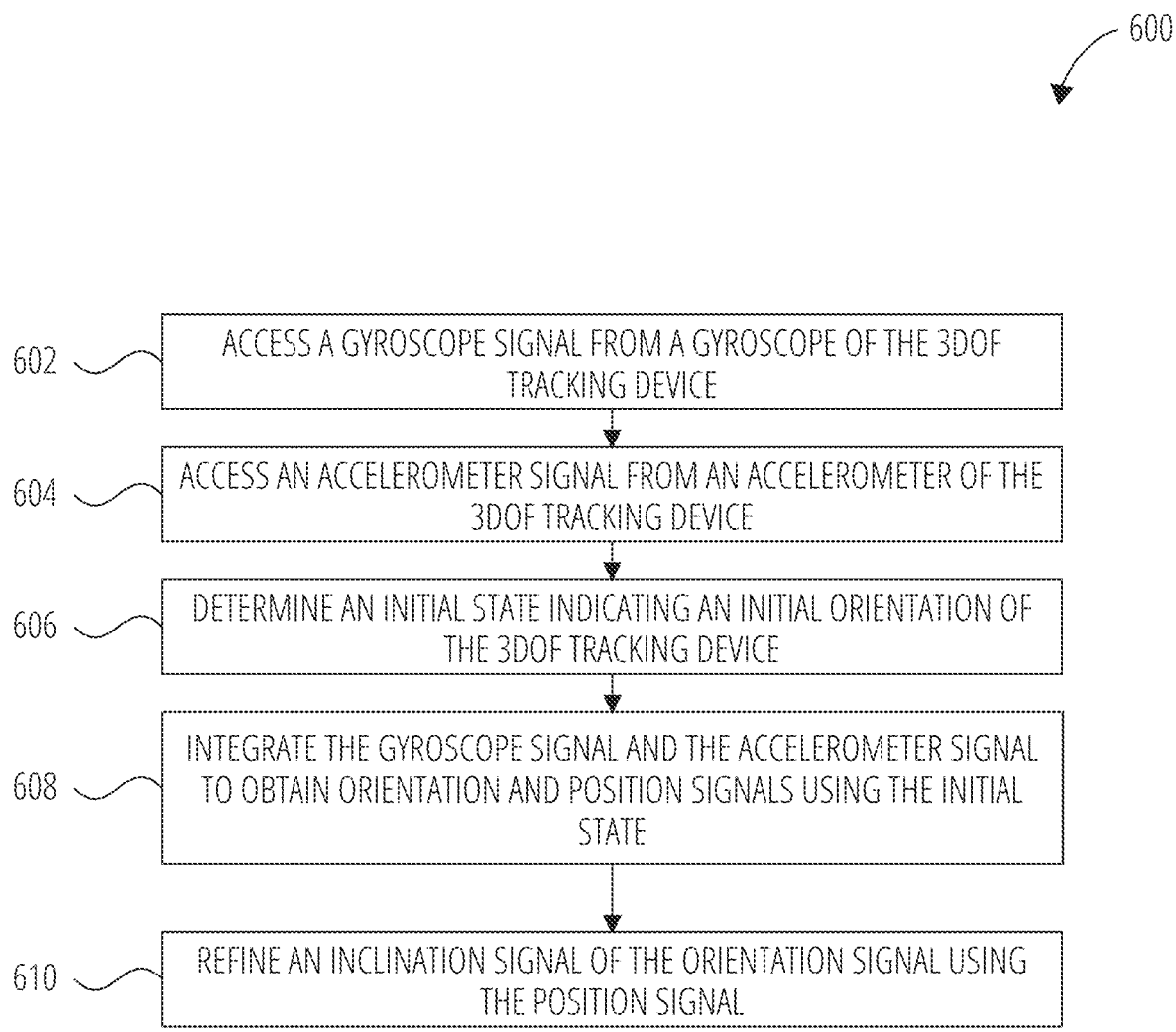
FIG. 6 illustrates a routine 600 in accordance with one embodiment.

FIG. 6 illustrates a routine 600 in accordance with one embodiment. In block 602, routine 600 accesses a gyroscope signal from a gyroscope of the 3DOF tracking device. In block 604, routine 600 accesses an accelerometer signal from an accelerometer of the 3DOF tracking device. In block 606, routine 600 determines an initial state indicating an initial orientation of the 3DOF tracking device. In block 608, routine 600 integrates the gyroscope signal and the accelerometer signal to obtain orientation and position signals using the initial state, the orientation and position signals indicating a starting position. In block 610, routine 600 refines an inclination signal of the orientation signal using the position signal.

Figure 7:
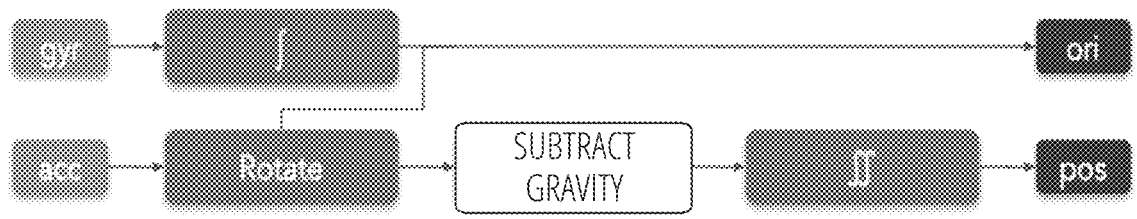
FIG. 7 is a block diagram illustrating an example algorithm for initialization in accordance with one example embodiment.

FIG. 7 is a block diagram illustrating an example algorithm for initialization in accordance with one example embodiment.

System with Head-Wearable Apparatus

Figure 8:
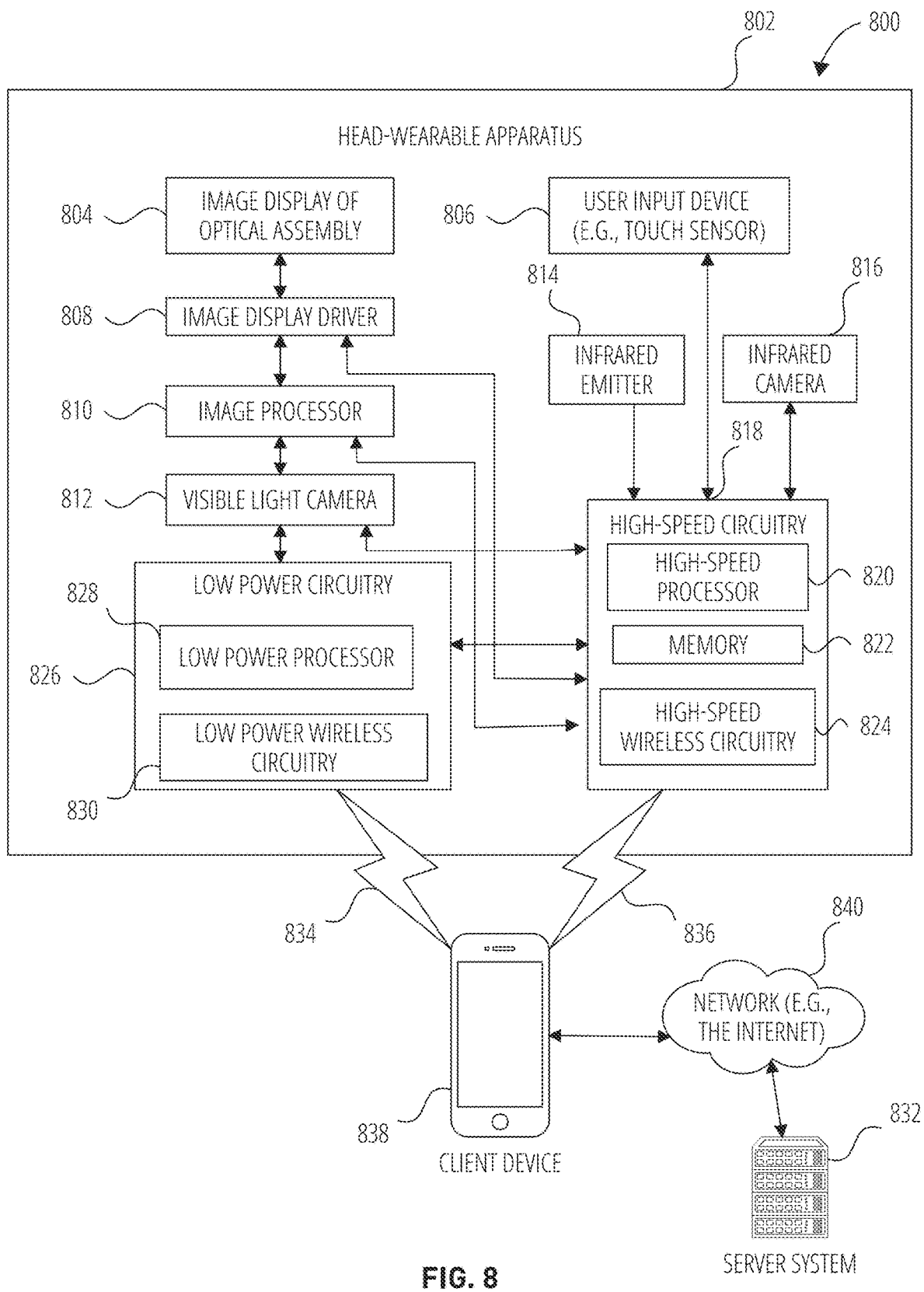
FIG. 8 illustrates a network environment in which a head-wearable device can be implemented according to one example embodiment.

FIG. 8 illustrates a network environment 800 in which the head-wearable apparatus 802 can be implemented according to one example embodiment. FIG. 8 is a high-level functional block diagram of an example head-wearable apparatus 802 communicatively coupled a mobile client device 838 and a server system 832 via various network 840.

head-wearable apparatus 802 includes a camera, such as at least one of visible light camera 812, infrared emitter 814 and infrared camera 816. The client device 838 can be capable of connecting with head-wearable apparatus 802 using both a communication 834 and a communication 836. client device 838 is connected to server system 832 and network 840. The network 840 may include any combination of wired and wireless connections.

The head-wearable apparatus 802 further includes two image displays of the image display of optical assembly 804. The two include one associated with the left lateral side and one associated with the right lateral side of the head-wearable apparatus 802. The head-wearable apparatus 802 also includes image display driver 808, image processor 810, low-power low power circuitry 826, and high-speed circuitry 818. The image display of optical assembly 804 are for presenting images and videos, including an image that can include a graphical user interface to a user of the head-wearable apparatus 802.

The image display driver 808 commands and controls the image display of the image display of optical assembly 804. The image display driver 808 may deliver image data directly to the image display of the image display of optical assembly 804 for presentation or may have to convert the image data into a signal or data format suitable for delivery to the image display device. For example, the image data may be video data formatted according to compression formats, such as H. 264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (Exif) or the like.

As noted above, head-wearable apparatus 802 includes a frame and stems (or temples) extending from a lateral side of the frame. The head-wearable apparatus 802 further includes a user input device 806 (e.g., touch sensor or push button) including an input surface on the head-wearable apparatus 802. The user input device 806 (E.g., touch sensor or push button) is to receive from the user an input selection to manipulate the graphical user interface of the presented image.

The components shown in FIG. 8 for the head-wearable apparatus 802 are located on one or more circuit boards, for example a PCB or flexible PCB, in the rims or temples. Alternatively, or additionally, the depicted components can be located in the chunks, frames, hinges, or bridge of the head-wearable apparatus 802. Left and right can include digital camera elements such as a complementary metal-oxide-semiconductor (CMOS) image sensor, charge coupled device, a camera lens, or any other respective visible or light capturing elements that may be used to capture data, including images of scenes with unknown objects.

The head-wearable apparatus 802 includes a memory 822 which stores instructions to perform a subset or all of the functions described herein. memory 822 can also include storage device.

As shown in FIG. 8, high-speed circuitry 818 includes high-speed processor 820, memory 822, and high-speed wireless circuitry 824. In the example, the image display driver 808 is coupled to the high-speed circuitry 818 and operated by the high-speed processor 820 in order to drive the left and right image displays of the image display of optical assembly 804. high-speed processor 820 may be any processor capable of managing high-speed communications and operation of any general computing system needed for head-wearable apparatus 802. The high-speed processor 820 includes processing resources needed for managing high-speed data transfers on communication 836 to a wireless local area network (WLAN) using high-speed wireless circuitry 824. In certain examples, the high-speed processor 820 executes an operating system such as a LINUX operating system or other such operating system of the head-wearable apparatus 802 and the operating system is stored in memory 822 for execution. In addition to any other responsibilities, the high-speed processor 820 executing a software architecture for the head-wearable apparatus 802 is used to manage data transfers with high-speed wireless circuitry 824. In certain examples, high-speed wireless circuitry 824 is configured to implement Institute of Electrical and Electronic Engineers (IEEE) 802.11 communication standards, also referred to herein as Wi-Fi. In other examples, other high-speed communications standards may be implemented by high-speed wireless circuitry 824.

The low power wireless circuitry 830 and the high-speed wireless circuitry 824 of the head-wearable apparatus 802 can include short range transceivers (Bluetooth™) and wireless wide, local, or wide area network transceivers (e.g., cellular or WiFi). The client device 838, including the transceivers communicating via the communication 834 and communication 836, may be implemented using details of the architecture of the head-wearable apparatus 802, as can other elements of network 840.

The memory 822 includes any storage device capable of storing various data and applications, including, among other things, camera data generated by the left and right, infrared camera 816, and the image processor 810, as well as images generated for display by the image display driver 808 on the image displays of the image display of optical assembly 804. While memory 822 is shown as integrated with high-speed circuitry 818, in other examples, memory 822 may be an independent standalone element of the head-wearable apparatus 802. In certain such examples, electrical routing lines may provide a connection through a chip that includes the high-speed processor 820 from the image processor 810 or low power processor 828 to the memory 822. In other examples, the high-speed processor 820 may manage addressing of memory 822 such that the low power processor 828 will boot the high-speed processor 820 any time that a read or write operation involving memory 822 is needed.

As shown in FIG. 8, the low power processor 828 or high-speed processor 820 of the head-wearable apparatus 802 can be coupled to the camera (visible light camera 812; infrared emitter 814, or infrared camera 816), the image display driver 808, the user input device 806 (e.g., touch sensor or push button), and the memory 822.

The head-wearable apparatus 802 is connected with a host computer. For example, the head-wearable apparatus 802 is paired with the client device 838 via the communication 836 or connected to the server system 832 via the network 840. server system 832 may be one or more computing devices as part of a service or network computing system, for example, that include a processor, a memory, and network communication interface to communicate over the network 840 with the client device 838 and head-wearable apparatus 802.

The client device 838 includes a processor and a network communication interface coupled to the processor. The network communication interface allows for communication over the network 840, communication 834 or communication 836. client device 838 can further store at least portions of the instructions for generating a binaural audio content in the client device 838's memory to implement the functionality described herein.

Output components of the head-wearable apparatus 802 include visual components, such as a display such as a liquid crystal display (LCD), a plasma display panel (PDP), a light emitting diode (LED) display, a projector, or a waveguide. The image displays of the optical assembly are driven by the image display driver 808. The output components of the head-wearable apparatus 802 further include acoustic components (e.g., speakers), haptic components (e.g., a vibratory motor), other signal generators, and so forth. The input components of the head-wearable apparatus 802, the client device 838, and server system 832, such as the user input device 806, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 802 may optionally include additional peripheral device elements. Such peripheral device elements may include biometric sensors, additional sensors, or display elements integrated with head-wearable apparatus 802. For example, peripheral device elements may include any I/O components including output components, motion components, position components, or any other such elements described herein.

For example, the biometric components include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WiFi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over and communication 836 from the client device 838 via the low power wireless circuitry 830 or high-speed wireless circuitry 824.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Changes and modifications may be made to the disclosed embodiments without departing from the scope of the present disclosure. These and other changes or modifications are intended to be included within the scope of the present disclosure, as expressed in the following claims.

Figure 9:
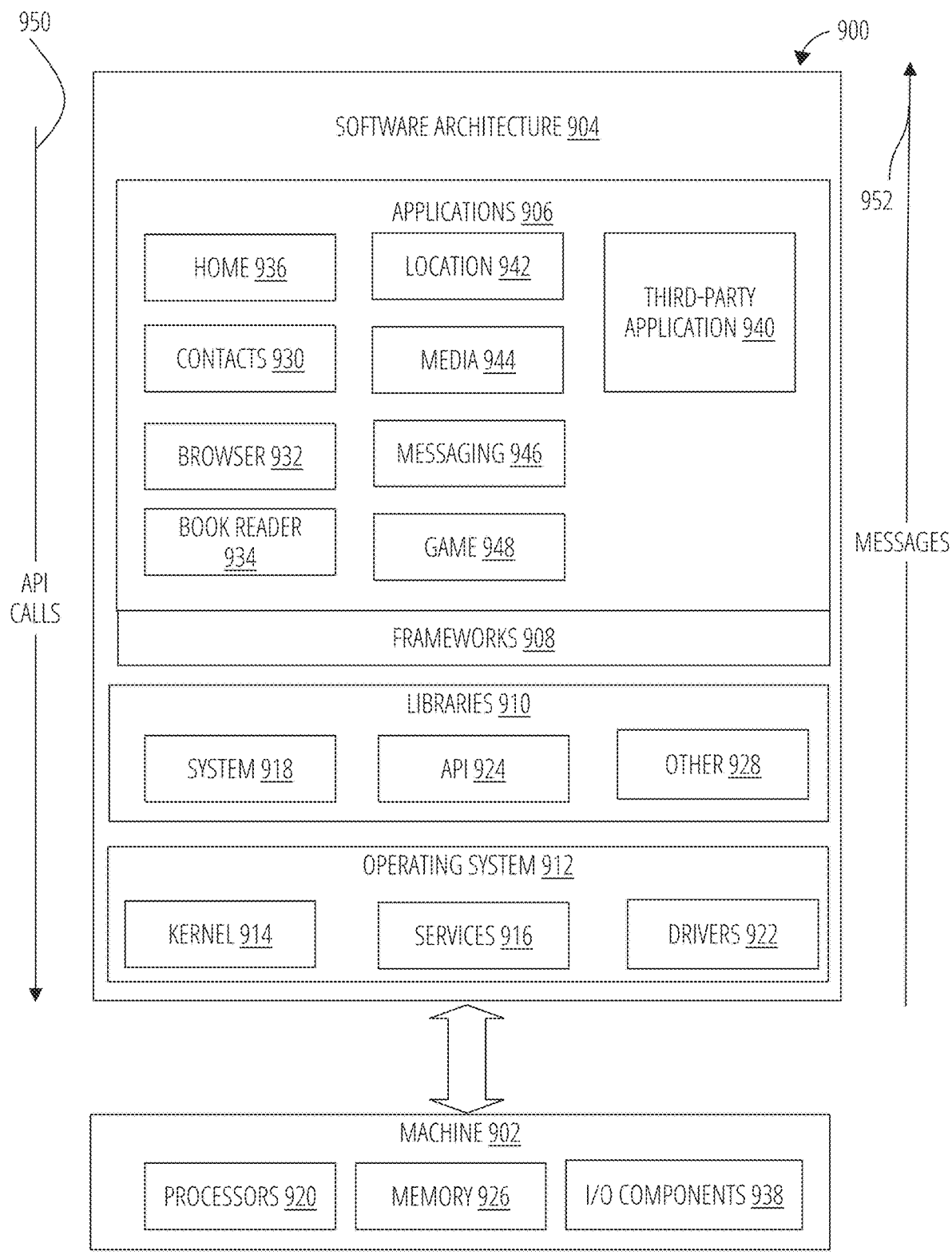
FIG. 9 is block diagram showing a software architecture within which the present disclosure may be implemented, according to an example embodiment.

FIG. 9 is a block diagram 900 illustrating a software architecture 904, which can be installed on any one or more of the devices described herein. The software architecture 904 is supported by hardware such as a machine 902 that includes Processors 920, memory 926, and I/O Components 938. In this example, the software architecture 904 can be conceptualized as a stack of layers, where each layer provides a particular functionality. The software architecture 904 includes layers such as an operating system 912, libraries 910, frameworks 908, and applications 906. Operationally, the applications 906 invoke API calls 950 through the software stack and receive messages 952 in response to the API calls 950.

The operating system 912 manages hardware resources and provides common services. The operating system 912 includes, for example, a kernel 914, services 916, and drivers 922. The kernel 914 acts as an abstraction layer between the hardware and the other software layers. For example, the kernel 914 provides memory management, Processor management (e.g., scheduling), Component management, networking, and security settings, among other functionality. The services 916 can provide other common services for the other software layers. The drivers 922 are responsible for controlling or interfacing with the underlying hardware. For instance, the drivers 922 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 910 provide a low-level common infrastructure used by the applications 906. The libraries 910 can include system libraries 918 (e.g., C standard library) that provide functions such as memory allocation functions, string manipulation functions, mathematic functions, and the like. In addition, the libraries 910 can include API libraries 924 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 910 can also include a wide variety of other libraries 928 to provide many other APIs to the applications 906.

The frameworks 908 provide a high-level common infrastructure that is used by the applications 906. For example, the frameworks 908 provide various graphical user interface (GUI) functions, high-level resource management, and high-level location services. The frameworks 908 can provide a broad spectrum of other APIs that can be used by the applications 906, some of which may be specific to a particular operating system or platform.

In an example embodiment, the applications 906 may include a home application 936, a contacts application 930, a browser application 932, a book reader application 934, a location application 942, a media application 944, a messaging application 946, a game application 948, and a broad assortment of other applications such as a third-party application 940. The applications 906 are programs that execute functions defined in the programs. Various programming languages can be employed to create one or more of the applications 906, structured in a variety of manners, such as object-oriented programming languages (e.g., Objective-C, Java, or C++) or procedural programming languages (e.g., C or assembly language). In a specific example, the third-party application 940 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 940 can invoke the API calls 950 provided by the operating system 912 to facilitate functionality described herein.

Figure 10:
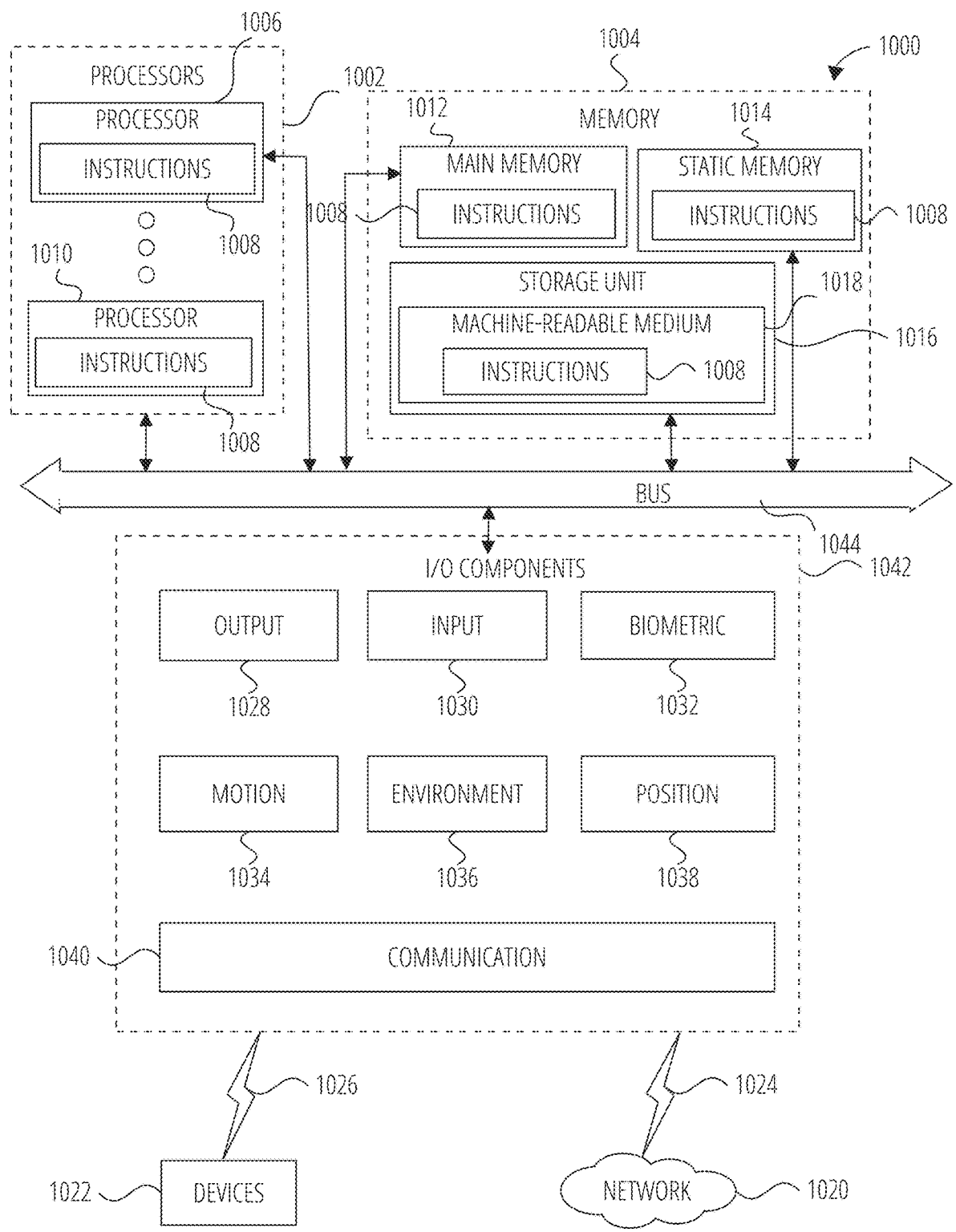
FIG. 10 is a diagrammatic representation of a machine in the form of a computer system within which a set of instructions may be executed for causing the machine to perform any one or more of the methodologies discussed herein, according to one example embodiment.

FIG. 10 is a diagrammatic representation of the machine 1000 within which instructions 1008 (e.g., software, a program, an application, an applet, an app, or other executable code) for causing the machine 1000 to perform any one or more of the methodologies discussed herein may be executed. For example, the instructions 1008 may cause the machine 1000 to execute any one or more of the methods described herein. The instructions 1008 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1008, sequentially or otherwise, that specify actions to be taken by the machine 1000. Further, while only a single machine 1000 is illustrated, the term "machine" shall also be taken to include a collection of machines that individually or jointly execute the instructions 1008 to perform any one or more of the methodologies discussed herein.

The machine 1000 may include Processors 1002, memory 1004, and I/O Components 1042, which may be configured to communicate with each other via a bus 1044. In an example embodiment, the Processors 1002 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an ASIC, a Radio-Frequency Integrated Circuit (RFIC), another Processor, or any suitable combination thereof) may include, for example, a Processor 1006 and a Processor 1010 that execute the instructions 1008. The term "Processor" is intended to include multi-core Processors that may comprise two or more independent Processors (sometimes referred to as "cores") that may execute instructions contemporaneously. Although FIG. 10 shows multiple Processors 1002, the machine 1000 may include a single Processor with a single core, a single Processor with multiple cores (e.g., a multi-core Processor), multiple Processors with a single core, multiple Processors with multiples cores, or any combination thereof.

The memory 1004 includes a main memory 1012, a static memory 1014, and a storage unit 1016, both accessible to the Processors 1002 via the bus 1044. The main memory 1004, the static memory 1014, and storage unit 1016 store the instructions 1008 embodying any one or more of the methodologies or functions described herein. The instructions 1008 may also reside, completely or partially, within the main memory 1012, within the static memory 1014, within machine-readable medium 1018 within the storage unit 1016, within at least one of the Processors 1002 (e.g., within the Processor's cache memory), or any suitable combination thereof, during execution thereof by the machine 1000.

The I/O Components 1042 may include a wide variety of Components to receive input, provide output, produce output, transmit information, exchange information, capture measurements, and so on. The specific I/O Components 1042 that are included in a particular machine will depend on the type of machine. For example, portable machines such as mobile phones may include a touch input device or other such input mechanisms, while a headless server machine will likely not include such a touch input device. It will be appreciated that the I/O Components 1042 may include many other Components that are not shown in FIG. 10. In various example embodiments, the I/O Components 1042 may include output Components 1028 and input Components 1030. The output Components 1028 may include visual Components (e.g., a display such as a plasma display panel (PDP), a light emitting diode (LED) display, a liquid crystal display (LCD), a projector, or a cathode ray tube (CRT)), acoustic Components (e.g., speakers), haptic Components (e.g., a vibratory motor, resistance mechanisms), other signal generators, and so forth. The input Components 1030 may include alphanumeric input Components (e.g., a keyboard, a touch screen configured to receive alphanumeric input, a photo-optical keyboard, or other alphanumeric input Components), point-based input Components (e.g., a mouse, a touchpad, a trackball, a joystick, a motion sensor, or another pointing instrument), tactile input Components (e.g., a physical button, a touch screen that provides location and/or force of touches or touch gestures, or other tactile input Components), audio input Components (e.g., a microphone), and the like.

In further example embodiments, the I/O Components 1042 may include biometric Components 1032, motion Components 1034, environmental Components 1036, or position Components 1038, among a wide array of other Components. For example, the biometric Components 1032 include Components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion Components 1034 include acceleration sensor Components (e.g., accelerometer), gravitation sensor Components, rotation sensor Components (e.g., gyroscope), and so forth. The environmental Components 1036 include, for example, illumination sensor Components (e.g., photometer), temperature sensor Components (e.g., one or more thermometers that detect ambient temperature), humidity sensor Components, pressure sensor Components (e.g., barometer), acoustic sensor Components (e.g., one or more microphones that detect background noise), proximity sensor Components (e.g., infrared sensors that detect nearby objects), gas sensors (e.g., gas detection sensors to detection concentrations of hazardous gases for safety or to measure pollutants in the atmosphere), or other Components that may provide indications, measurements, or signals corresponding to a surrounding physical environment. The position Components 1038 include location sensor Components (e.g., a GPS receiver Component), altitude sensor Components (e.g., altimeters or barometers that detect air pressure from which altitude may be derived), orientation sensor Components (e.g., magnetometers), and the like.

Communication may be implemented using a wide variety of technologies. The I/O Components 1042 further include communication Components 1040 operable to couple the machine 1000 to a network 1020 or devices 1022 via a coupling 1024 and a coupling 1026, respectively. For example, the communication Components 1040 may include a network interface Component or another suitable device to interface with the network 1020. In further examples, the communication Components 1040 may include wired communication Components, wireless communication Components, cellular communication Components, Near Field Communication (NFC) Components, Bluetooth® Components (e.g., Bluetooth® Low Energy), Wi-Fi® Components, and other communication Components to provide communication via other modalities. The devices 1022 may be another machine or any of a wide variety of peripheral devices (e.g., a peripheral device coupled via a USB).

Moreover, the communication Components 1040 may detect identifiers or include Components operable to detect identifiers. For example, the communication Components 1040 may include Radio Frequency Identification (RFID) tag reader Components, NFC smart tag detection Components, optical reader Components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection Components (e.g., microphones to identify tagged audio signals). In addition, a variety of information may be derived via the communication Components 1040, such as location via Internet Protocol (IP) geolocation, location via Wi-Fi® signal triangulation, location via detecting an NFC beacon signal that may indicate a particular location, and so forth.

The various memories (e.g., memory 1004, main memory 1012, static memory 1014, and/or memory of the Processors 1002) and/or storage unit 1016 may store one or more sets of instructions and data structures (e.g., software) embodying or used by any one or more of the methodologies or functions described herein. These instructions (e.g., the instructions 1008), when executed by Processors 1002, cause various operations to implement the disclosed embodiments.

The instructions 1008 may be transmitted or received over the network 1020, using a transmission medium, via a network interface device (e.g., a network interface Component included in the communication Components 1040) and using any one of a number of well-known transfer protocols (e.g., hypertext transfer protocol (HTTP)). Similarly, the instructions 1008 may be transmitted or received using a transmission medium via the coupling 1026 (e.g., a peer-to-peer coupling) to the devices 1022.

As used herein, the terms "Machine-Storage Medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of Machine-Storage Media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "Machine-Storage Media," "computer-storage media," and "device-storage media" specifically exclude carrier waves, modulated data signals, and other such media, at least some of which are covered under the term "signal medium" discussed below.

The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1416 for execution by the machine 1400, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "Computer-Readable Medium," and "device-readable medium" mean the same thing and may be used interchangeably in this disclosure. The terms are defined to include both Machine-Storage Media and transmission media. Thus, the terms include both storage devices/media and carrier waves/modulated data signals.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

EXAMPLES

Example 1 is a method for dynamically initializing a 3 degrees of freedom (3DOF) tracking device comprising: accessing a gyroscope signal from a gyroscope of the 3DOF tracking device; accessing an accelerometer signal from an accelerometer of the 3DOF tracking device; determining an initial state comprising a combination of an initial orientation, an initial position, and an initial velocity of the 3DOF tracking device, the initial state indicating a starting condition of the 3DOF tracking device; integrating the gyroscope signal and the accelerometer signal to obtain orientation and position signals using the initial state; and refining an inclination signal of the orientation signal using the position signal.

Example 2 includes example 1, wherein refining the inclination signal comprises: constraining the position signal to remain substantially close to the starting position.

Example 3 includes example 1, wherein determining the initial state comprises: determining the initial state is based on the accelerometer signal without requiring the 3DOF tracking device to remain in stationary conditions.

Example 4 includes example 1, wherein determining the initial state comprises: using previously estimated orientation and positional signals of the 3DOF tracking device.

Example 5 includes example 1, wherein integrating the gyroscope signal and the accelerometer signal comprise: integrating the gyroscope signal to determine the orientation signal starting from the initial orientation; rotating the accelerometer signal from the accelerometer using the orientation signal; subtracting gravity; and performing a double integration starting from the initial position to determine the position signal.

Example 6 includes example 1, further comprising: correcting the gyroscope signal and the accelerometer signal with biases; and refining the inclination signal and biases using the position signal.

Example 7 includes example 1, further comprising: accessing a magnetometer signal from a magnetometer of the 3DOF tracking device; and refining the orientation signal using the magnetometer signal.

Example 8 includes example 1, further comprising: accessing a location signal from a radio-based sensor of the 3DOF tracking device; and refining the position signal using the location signal.

Example 9 includes example 1, further comprising: detecting that the 3DOF tracking device is switched on; and in response to detecting that the 3DOF tracking device is switched on, initializing the 3DOF tracking device without waiting for the stationary condition of the 3DOF tracking device.

Example 10 includes example 9, further comprising: continuously determine the inclination after detecting that the 3DOF tracking device is turned on.

Example 11 is a computing apparatus comprising: a processor; and a memory storing instructions that, when executed by the processor, configure the apparatus to perform operations comprising: accessing a gyroscope signal from a gyroscope of a 3DOF tracking device; accessing an accelerometer signal from an accelerometer of the 3DOF tracking device; determining an initial state comprising a combination of an initial orientation, an initial position, and an initial velocity of the 3DOF tracking device, the initial state indicating a starting condition of the 3DOF tracking device; integrating the gyroscope signal and the accelerometer signal to obtain orientation and position signals using the initial state; and refining an inclination signal of the orientation signal using the position signal.

Example 12 includes example 11, wherein refining the inclination signal comprises: constrain the position signal to remain substantially close to the starting position.

Example 13 includes example 11, wherein determining the initial state comprises: determine the initial state is based on the accelerometer signal without requiring the 3DOF tracking device to remain in stationary conditions.

Example 14 includes example 11, wherein determining the initial state comprises: use previously estimated orientation and positional signals of the 3DOF tracking device.

Example 15 includes example 11, wherein integrating the gyroscope signal and the accelerometer signal comprise: integrate the gyroscope signal to determine the orientation signal starting from the initial orientation; rotate the accelerometer signal from the accelerometer using the orientation signal; subtract gravity; and perform a double integration starting from the initial position to determine the position signal.

Example 16 includes example 11, wherein the instructions further configure the apparatus to: correct the gyroscope signal and the accelerometer signal with biases; and refine the inclination signal and biases using the position signal.

Example 17 includes example 11, wherein the instructions further configure the apparatus to: access a magnetometer signal from a magnetometer of the 3DOF tracking device; and refine the orientation signal using the magnetometer signal.

Example 18 includes example 11, wherein the instructions further configure the apparatus to: access a location signal from a radio-based sensor of the 3DOF tracking device; and refine the position signal using the location signal.

Example 19 includes example 11, wherein the instructions further configure the apparatus to: detect that the 3DOF tracking device is switched on; in response to detecting that the 3DOF tracking device is switched on, initializing the 3DOF tracking device without waiting for the stationary condition of the 3DOF tracking device; and continuously determine the inclination after detecting that the 3DOF tracking device is turned on.

Example 20 is a non-transitory computer-readable storage medium, the computer-readable storage medium including instructions that when executed by a computer, cause the computer to perform operations comprising: accessing a gyroscope signal from a gyroscope of a 3DOF tracking device; accessing an accelerometer signal from an accelerometer of the 3DOF tracking device; determining an initial state comprising a combination of an initial orientation, an initial position, and an initial velocity of the 3DOF tracking device, the initial state indicating a starting condition of the 3DOF tracking device; integrating the gyroscope signal and the accelerometer signal to obtain orientation and position signals using the initial state; and refining an inclination signal of the orientation signal using the position signal.

What is claimed is:

1. A method comprising:
    turning on a 3 degrees of freedom (3DOF) tracking device;
    in response to turning on the 3DOF tracking device, performing a dynamic initialization process of the 3DOF tracking device by determining an initial state that indicates a dynamic and non-stationary condition of the 3DOF tracking device, the initial state corresponding with turning on the 3DOF tracking device; and
    operating the 3DOF tracking device based on the dynamic and non-stationary condition of the 3DOF tracking device after the dynamic initialization process.

2. The method of claim 1, wherein the initial state comprises a combination of an initial orientation of the 3DOF tracking device, an initial position of the 3DOF tracking device, and an initial velocity of the 3DOF tracking device, wherein the 3DOF tracking device is part of an augmented reality device.

3. The method of claim 2, wherein determining the initial state further comprises:
    in response to turning on the 3DOF tracking device, accessing a gyroscope signal from a gyroscope of the 3DOF tracking device;
    in response to turning on the 3DOF tracking device, accessing an accelerometer signal from an accelerometer of the 3DOF tracking device;
    integrating the gyroscope signal and the accelerometer signal to obtain an orientation signal and a position signal using the initial state;
    refining an inclination signal of the orientation signal using the position signal; and
    constraining the position signal to remain substantially close to the initial position of the 3DOF tracking device.

4. The method of claim 3, wherein determining the initial state comprises:
    determining the initial state is based on the accelerometer signal without requesting a user of the 3DOF tracking device to remain in stationary conditions.

5. The method of claim 3, wherein determining the initial state comprises:
    using previously estimated orientation and positional signals of the 3DOF tracking device.

6. The method of claim 3, wherein integrating the gyroscope signal and the accelerometer signal comprise:
    integrating the gyroscope signal to determine the orientation signal starting from the initial orientation;
    rotating the accelerometer signal from the accelerometer using the orientation signal;
    subtracting gravity; and
    performing a double integration starting from the initial position to determine the position signal.

7. The method of claim 3, further comprising:
    after integrating only the gyroscope signal and the accelerometer signal, correcting the gyroscope signal and the accelerometer signal with biases; and
    refining the inclination signal and biases using the position signal.

8. The method of claim 3, further comprising:
    after integrating only the gyroscope signal and the accelerometer signal, accessing a magnetometer signal from a magnetometer of the 3DOF tracking device; and
    refining the orientation signal using the magnetometer signal.

9. The method of claim 3, further comprising:
    after integrating only the gyroscope signal and the accelerometer signal, accessing a location signal from a radio-based sensor of the 3DOF tracking device; and
    refining the position signal using the location signal.

10. The method of claim 1, further comprising:
    detecting that the 3DOF tracking device is switched on; and
    in response to detecting that the 3DOF tracking device is switched on, initializing the 3DOF tracking device without waiting for a stationary condition of the 3DOF tracking device.

11. A computing apparatus comprising:
    a processor; and
    a memory storing instructions that, when executed by the processor, configure the apparatus to perform operations comprising:
    turning on a 3 degrees of freedom (3DOF) tracking device;
    in response to turning on the 3DOF tracking device, performing a dynamic initialization process of the 3DOF tracking device by determining an initial state that indicates a dynamic and non-stationary condition of the 3DOF tracking device, the initial state corresponding with turning on the 3DOF tracking device; and
    operating the 3DOF tracking device based on the dynamic and non-stationary condition of the 3DOF tracking device after the dynamic initialization process.

12. The computing apparatus of claim 11, wherein the initial state comprises a combination of an initial orientation of the 3DOF tracking device, an initial position of the 3DOF tracking device, and an initial velocity of the 3DOF tracking device, wherein the 3DOF tracking device is part of an augmented reality device.

13. The computing apparatus of claim 12, wherein determining the initial state further comprises:
    accessing a gyroscope signal from a gyroscope of the 3DOF tracking device;
    accessing an accelerometer signal from an accelerometer of the 3DOF tracking device;
    integrating the gyroscope signal and the accelerometer signal to obtain an orientation signal and a position signal using the initial state;
    refining an inclination signal of the orientation signal using the position signal; and
    constraining the position signal to remain substantially close to the initial position of the 3DOF tracking device.

14. The computing apparatus of claim 13, wherein determining the initial state comprises:

determining the initial state is based on the accelerometer signal without requesting a user of the 3DOF tracking device to remain in stationary conditions.

15. The computing apparatus of claim 13, wherein determining the initial state comprises:
using previously estimated orientation and positional signals of the 3DOF tracking device.

16. The computing apparatus of claim 13, wherein integrating the gyroscope signal and the accelerometer signal comprise:
integrating the gyroscope signal to determine the orientation signal starting from the initial orientation;
rotating the accelerometer signal from the accelerometer using the orientation signal;
subtracting gravity; and
performing a double integration starting from the initial position to determine the position signal.

17. The computing apparatus of claim 13, wherein the operations further comprise:
after integrating only the gyroscope signal and the accelerometer signal, correcting the gyroscope signal and the accelerometer signal with biases, and
refining the inclination signal and biases using the position signal.

18. The computing apparatus of claim 13, wherein the operations further comprise:
after integrating only the gyroscope signal and the accelerometer signal, accessing a magnetometer signal from a magnetometer of the 3DOF tracking device; and
refining the orientation signal using the magnetometer signal.

19. The computing apparatus of claim 13, wherein the operations further comprise:
after integrating only the gyroscope signal and the accelerometer signal, accessing a location signal from a radio-based sensor of the 3DOF tracking device; and
refining the position signal using the location signal.

20. A non-transitory computer-readable storage medium, the computer-readable storage medium including instructions that when executed by a computer, cause the computer to perform operations comprising:
turning on a 3 degrees of freedom (3DOF) tracking device;
in response to turning on the 3DOF tracking device, performing a dynamic initialization process of the 3DOF tracking device by determining an initial state that indicates a dynamic and non-stationary condition of the 3DOF tracking device, the initial state corresponding with turning on the 3DOF tracking device; and
operating the 3DOF tracking device based on the dynamic and non-stationary condition of the 3DOF tracking device after the dynamic initialization process.

* * * * *

UNITED STATES PATENT AND TRADEMARK OFFICE
CERTIFICATE OF CORRECTION

PATENT NO. : 12,411,560 B2
APPLICATION NO. : 18/435540
DATED : September 9, 2025
INVENTOR(S) : Hol et al.

Page 1 of 1

It is certified that error appears in the above-identified patent and that said Letters Patent is hereby corrected as shown below:

In the Claims

In Column 21, Line 23, in Claim 17, delete "biases," and insert --biases;-- therefor Signed and Sealed this
Sixth Day of January, 2026

John A. Squires
*Director of the United States Patent and Trademark Office*